July 25, 1933.  W. A. BLUME  1,919,998
FRICTION CLUTCH BLOCK
Filed Jan. 31, 1931
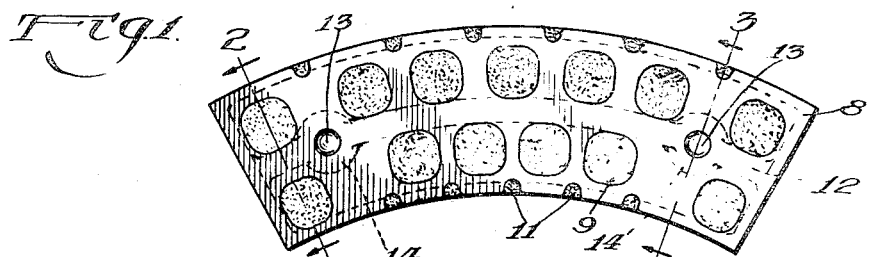
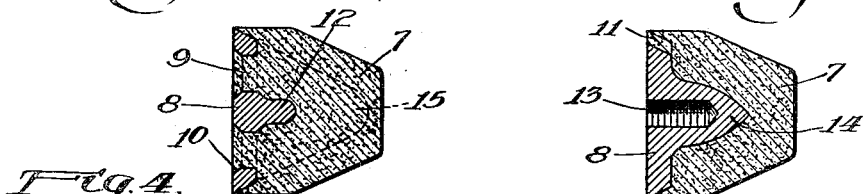
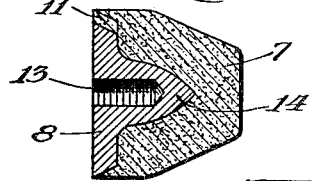
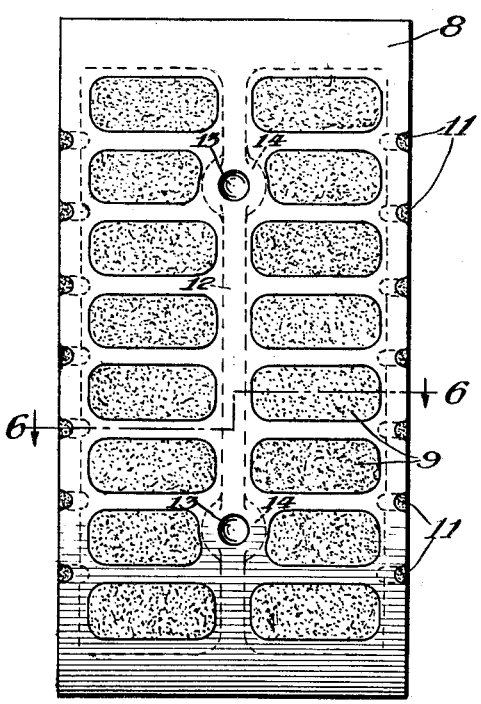
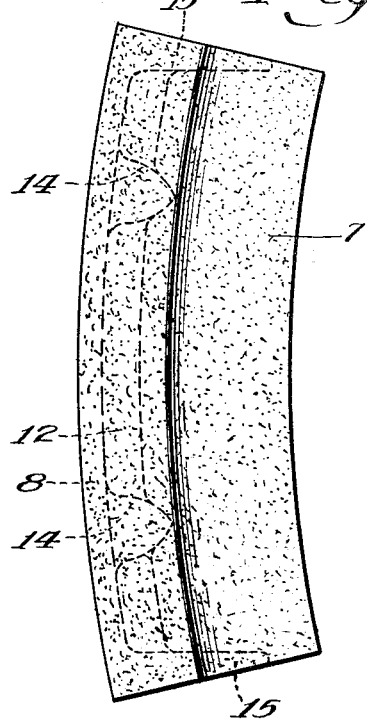
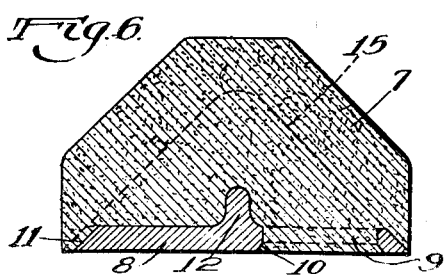

Patented July 25, 1933

1,919,998

UNITED STATES PATENT OFFICE

WILLIAM A. BLUME, OF DETROIT, MICHIGAN, ASSIGNOR TO AMERICAN BRAKEBLOK CORPORATION, OF NEW YORK, N. Y., A CORPORATION OF NEW YORK

FRICTION CLUTCH BLOCK

Application filed January 31, 1931. Serial No. 512,565.

This invention relates to friction blocks for clutches and one object of the invention is to provide a novel and efficient friction block which can be made in a form and size adapted for a friction clutch assembly and easily and quickly secured in rigid position therein.

Another object is to provide a friction block comprising a composition body mounted upon a supporting back having openings therein to receive the body for securely anchoring the body thereto.

And a further object is to provide a friction block comprising a composition body mounted upon a supporting back to prevent warping and distorting.

And a still further object is to provide a friction block embodying a back to which attaching devices may be connected to secure the block to a carrying member.

In the accompanying drawing I have illustrated a selected embodiment of the invention and referring thereto Fig. 1 is a plan view of the friction clutch block;

Fig. 2 is a sectional view taken on the line 2—2 of Fig. 1;

Fig. 3 is a sectional view taken on the line 3—3 of Fig. 1;

Fig. 4 is a plan view of a friction block showing a modified form of a supporting back;

Fig. 5 is a side view of the block shown in Fig. 4; and

Fig. 6 is a sectional view taken on the line 6—6 of Fig. 4.

The block comprises a body 7 made of suitable composition or other material mounted upon a rigid back 8 having openings 9 therein for receiving a part of the body. It is desirable that the back be made of cast iron or other metal or material which will withstand the tendency of the block to warp or distort due to the heat of friction generated and the thrust imparted thereto. The openings 9 are tapered at 10 for securely anchoring the body therein. These openings may be substantially round as shown in Fig. 1, or elongated as shown in Fig. 4, to accomplish the same result.

The body also has tapered notches 11 on the side edges thereof to assist in securing the body to the back. The back 8 has a rib 12 extending longitudinally thereof for strengthening purposes and to increase the rigidity of the back. Attaching openings 13 are provided in the back through the rib in the center and surrounded by lugs 14 forming part of the back, the openings being threaded to receive attaching devices. Flanges 15 are provided on the back at the ends thereof for more securely holding the body in proper position upon the back and to receive and absorb a portion of the end thrust of the body. The flanges 15 correspond substantially to the contour of the end of the body and are spaced from the friction surface of the body sufficiently to avoid engagement with the opposing friction surfaces during the period of wear on the friction surface of the body. The friction clutch on which this block is adapted to be used is comprised of a flywheel provided with an annular groove in one face thereof for blocks as shown in Fig. 1, or an annular groove on the periphery thereof for blocks as shown in Figs. 4 and 5, the groove being tapered complementary to the friction surface of the body of the block whereby when said surfaces are engaged in the groove the flywheel will be connected to the driven member carrying the blocks having the friction surfaces thereon, it being understood that the blocks are arcuate in form to permit installation in ring-like position for cooperation with the groove in the flywheel.

I have indicated in the drawing selected embodiments of my invention, but I do not restrict myself to these embodiments and I reserve the right to make all changes in the form, construction and arrangement of parts of the invention which may come within the scope of the following claims.

I claim:

1. A friction clutch block comprising a composition body and a supporting back therefor, lugs on said back embedded in said body and having openings extending into said lugs to receive attaching devices, and a strengthening rib on said back and embedded in said body and extending longitudinally thereof and between said lugs to reenforce said lugs and said back.

2. A friction clutch block comprising a composition body and a supporting back therefor, a flange on the end of said back for receiving the end thrust, lugs on said back embedded in said body and having openings extending into said lugs to receive attaching devices, and a strengthening rib on said back and extending between said lugs for reenforcing said back and said lugs.

3. A friction clutch block comprising a composition body and a supporting back therefor having openings to receive parts of the body for anchoring it to the back and having notches in the edges thereof for further anchoring the body, flanges at the ends of the body to receive the end thrust, lugs on said back embedded in said body and having attaching openings therein to receive attaching devices, and a strengthening rib extending longitudinally of the back and between said lugs for reenforcing the back and said lugs.

4. A friction clutch comprising a composition body and a supporting back therefor, flanges on the ends of the back to receive the end thrust of the body, and an integral rib on the inner side of the back extending longitudinally thereof and connected at its ends to said flanges.

WILLIAM A. BLUME.